(12) United States Patent
Gotesman et al.

(10) Patent No.: US 6,327,271 B1
(45) Date of Patent: Dec. 4, 2001

(54) PROGRAMMABLE REASSEMBLY OF DATA RECEIVED IN AN ATM NETWORK

(75) Inventors: Joel Gotesman, Sunnyvale; Gregory Vance Gritton, San Jose, both of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/568,561

(22) Filed: May 9, 2000

Related U.S. Application Data

(63) Continuation of application No. 08/846,355, filed on Apr. 30, 1997, and a continuation of application No. 08/846,706, filed on Apr. 30, 1997, now Pat. No. 6,097,734.

(51) Int. Cl.$^7$ .................................................. H04J 3/24
(52) U.S. Cl. ............................................ 370/474; 370/395
(58) Field of Search ................................ 370/474, 395, 370/396, 397, 398, 399, 409, 428, 429, 465, 389, 466, 470, 471, 472, 476, 473, 475, 469, 419

(56) References Cited

U.S. PATENT DOCUMENTS

| | | | |
|---|---|---|---|
| 5,303,302 | * | 4/1994 | Burrows .................................. 380/49 |
| 5,822,321 | * | 10/1998 | Petersen et al. ...................... 370/474 |
| 6,097,734 | * | 8/2000 | Gotesman et al. ................... 370/474 |

\* cited by examiner

*Primary Examiner*—Douglas Olms
*Assistant Examiner*—Brian Nguyen
(74) *Attorney, Agent, or Firm*—Martine & Penilla, LLP

(57) ABSTRACT

An improved network interface card (NIC) allows received ATM cells of a protocol data unit (PDU) to be grouped by a programmable size and then sent via an efficient DMA transfer to the host computer memory. Sizes of the blocks of data transferred from the NIC to the host memory are optimized for virtual circuit type, PDU type, NIC memory constraints, bus bandwidth, maximum DMA transfer rate, etc. A destination host receives cells for multiple virtual circuits in an interleaved fashion for various PDUs. The received cells are divided up by virtual circuit; cells for one virtual circuit are stored in a linked list of slots, where each slot contains one ATM cell. Cells from each virtual circuit are linked together in a group, with a separate linked list of cells for each virtual circuit. A programmable group size parameter defines how many cells are grouped together in the linked list before the group is dispatched to system memory in the host computer. When the number of cells in a linked list reaches this programmable group size, or when the last cell of a PDU arrives, the linked list of cells is sent via DMA transfer to host memory. The DMA transfer uses buffers in the host computer memory to complete the PDU reassembly process. Groups of cells are transferred from the NIC to the host computer buffers as a single group. If a buffer fills up, or a PDU is complete, a new host computer buffer is used for additional portions of that PDU or for a subsequent PDU.

4 Claims, 4 Drawing Sheets

| | | | | |
|---|---|---|---|---|
| STATUS | CONTROL | FIRST SLOT | LAST SLOT | VC #1 |
| CRC | CELL COUNTER | BUFFER STATUS | | |
| STATUS | CONTROL | FIRST SLOT | LAST SLOT | VC #2 |
| CRC | CELL COUNTER | BUFFER STATUS | | |
| STATUS | CONTROL | FIRST SLOT | LAST SLOT | VC #3 |
| CRC | CELL COUNTER | | | |
| ••• | | ••• | | ••• |

VIRTUAL CIRCUIT TABLE

PROGRAMMABLE REASSEMBLY OF DATA RECEIVED IN AN ATM NETWORK

CROSS REFERENCE TO RELATED APPLICATIONS

This application is a continuation of Ser. No. 08/846,355 entitled "Programmable Memory Access of Data to be Transmitted", and Ser. No. 08/846,706, entitled "Methods and Apparatuses for Scheduling ATM Cells", both filed on the same date herewith, and both of which are incorporated by reference.

FIELD OF THE INVENTION

The present invention relates generally to data communications and the interface between a computer system and a network, and more particularly to methods and apparatus for efficiently receiving an asynchronous transfer mode (ATM) protocol data unit (PDU) over an ATM network.

BACKGROUND OF THE INVENTION

Asynchronous transfer mode (ATM) configured networks allow high-speed data, voice and video communications to be conducted between endpoint computer systems. ATM networks, which are based on the transmission of fixed-length data packets, have proven to be extremely useful because they combine the benefits of both a switched network (i.e., constant transmission delay, guaranteed capacity) and a packet switched network (i.e., flexibility and efficiency for intermittent traffic).

Current ATM standards are defined by the International Telecommunication Union and (ITU) ATM Forum specifications, which are herein incorporated by reference. As is common in contemporary communications protocols, several protocol layers are used to functionally divide the communications task within an ATM network. The ATM protocol layers are similar in scope to the Open System Interconnection (OSI) reference model that is defined by the International Standardization Organization (ISO).

In ATM networks, a variable length protocol data unit (PDU) defines the data to be shared between higher protocol layers, such as the application layer software programs operating at the endpoint computer systems. A typical PDU includes the data to be shared along with additional header and trailer information. To transmit the PDU over an ATM configured network, each PDU is further divided into fixed-length transmission units, known as cells. A typical cell is 53 bytes long and includes a 5-byte header containing its' connection identifier and a 48-byte payload. Thus, a 480-byte PDU would be divided into ten cells, each cell having a 48 byte payload, or one tenth of the total PDU.

During transmission, a cell is sent from one endpoint computer system to another through a virtual circuit within the interconnecting ATM network. A virtual circuit acts as a logically independent connection with another network node. A virtual circuit typically is a concatenation of communication links established between the two endpoints where higher layer protocols are accessed. By definition, ATM cells are transmitted in a sequence over an established virtual circuit. As such, the virtual circuit exists throughout the transmission of a PDU. One of the advantages of an ATM configured network is that a number of virtual circuits can be established over a single wire or fiber connecting the sending computer system to the network by time-division multiplexing the cells from different PDUs.

Typically, an ATM Network Interface Card (NIC) and accompanying software are provided within the sending (or receiving) endpoint computer systems to transmit (or receive) the cells of a PDU over a virtual circuit. In terms of the OSI reference protocol model, a typical NIC provides link layer functionality by supplying cells in a specific sequence to the physical layer of the ATM network. In contrast, the virtual circuits within the ATM network are typically established at a higher level layer, as are the PDUs and information therein.

FIG. 1A is a block diagram illustrating a typical ATM network 10 having a first endpoint computer labeled host 12, a network 14, and one or more additional endpoint computers labeled end stations 16. Within network 14 there are illustrated, by way of dashed connecting lines, a plurality of virtual circuits 18 that represent the communication channels established between host 12 and end stations 16 during an ATM communication. By way of example, network 14 may include one or more telecommunications and/or data networks, having switching devices, routing devices, and dedicated communication lines and/or fibers that are capable of providing a communication link between host 12 and end stations 16. Host 12 and end stations 16 may, for example, be personal computer systems, workstations, mainframes, or other like processing devices that are capable of sending and receiving ATM PDUs.

FIG. 1B is a block diagram that illustrates one possible configuration of an endpoint computer system (such as host 12 in FIG. 1A) having a processor 20, a host bus 22, a system memory 24, a PCI controller 26, a PCI bus 28, a NIC 30, and an optional SCSI interface 32 and SCSI device 34. Processor 20 may be a microprocessor or central processing unit (CPU) configured to access system memory 24. System memory 24 may be a dynamic random access memory (DRAM) that is accessed via host bus 22 or by way of another interconnecting circuit. SCSI device 34 may be a secondary data storage device, such as a disk drive unit, that can be accessed by processor 20 by way of host bus 22, PCI controller 26, PCI bus 28, and SCSI interface 32. As shown, processor 20 can also access network 14 by way of PCI bus 28 and NIC 30. It is recognized that additional processors, other devices, additional buses, etc., can be connected to either the host bus or to the PCI bus as is common in modern computing configurations.

In a typical endpoint computer system, when the higher level protocol and/or application layers require a PDU to b e transmitted over network 14 to another endpoint computer system several process steps occur. First, a virtual circuit is established by processor 20 via NIC 30. Next, the PDU is stored in system memory 24 by processor 20. Following that, NIC 30 is directed by processor 20 to complete the desired PDU transmission. To complete the transmission of the PDU, NIC 30 fetches the cells within the PDU and transmit these cells one-by-one over a virtual circuit in network 14.

On the receiving end of th e ATM network is another endpoint computer. This endpoint computer also includes a NIC 30 that receives the incoming cells in the same order as they were transmitted. As the cells are received, it is the task of NIC 30 and/or processor 20 to reassemble the cells into th e original PDU. The reassembled PDU can then be provided to the higher layer applications. As such, one important consideration in the design and operation of a NIC and its associated software is the reassembly of the PDU and the transferring of either the received cells and/or a reassembled PDU from the NIC to the system memory in the computer. A NIC that is able to effect the transfer of a PDU to system memory efficiently is valuable.

Conventional NICs can b e divided into one of two groups based upon their reassembly methods. In the first reassembly method, the NIC provides each cell as it arrives to the system memory. The NIC manages reassembly buffers in system memory, sending a received cell to the appropriate buffer based on its virtual circuit identifier and thereby reassembling the PDU. This type of reassembly is used, for example, in the IDT77201 product available from Integrated Device Technology Inc. of Santa Clara, Calif. While this type of operation tends to reduce the amount of memory required on the NIC, it also tends to place an unacceptable load or "transfer burden" on the interconnecting devices and buses which are required during the sequential transferring of each of the received cells from the NIC to the system memory. That is, the overhead with transferring a cell at a time from the NIC to system memory may be high.

The second reassembly method attempts to r educe the burden on the interconnecting devices and buses by providing enough memory on-board the NIC to store a complete PDU before transfer. Thus, with this type of NIC the entire PDU is reassembled in the NIC's local memory and then is transferred at one time from the NIC to the host memory. This type of reassembly is used, for example, in the 5930 product available from Adaptec Inc. of Milpitas, Calif. While this type of NIC tends to reduce the "transfer burden" by minimizing the amount of time required to transfer the reassembled PDU from the NIC to the host memory, the amount of on-board local memory required to support a number of virtual circuits (i.e., memory for simultaneously storing and reassembling a number of PDUs) can reduce the overall effectiveness of the NIC, and/or greatly increase the NIC's cost, power consumption and size.

Thus, what is desired are improved methods and apparatus for PDU reassembly that effectively reduce the "transfer burden" on the interconnecting devices, buses, and/or the host processor, while also minimizing the amount of on-board memory required for the NIC.

SUMMARY OF THE INVENTION

To achieve the foregoing, and in accordance with the purpose of the present invention, a reassembly apparatus and method is disclosed that allows cells to be grouped by a programmable size in an improved network interface card and then sent via an efficient DMA transfer to the host computer memory.

The present invention provides improved methods and apparatus for use with a host computer system that effectively reduce the "transfer burden" on the host processor, interconnecting devices and buses by optimizing the size of the blocks of data transferred from the NIC to the host memory. When embodied in a network interface card (NIC) or similar circuitry, the method and apparatus of the present invention also minimizes the amount of on-board memory required by the NIC, or increases the number of virtual circuits that are capable of being supported in a given amount of memory.

A destination NIC of a host receives cells for multiple virtual circuits in an interleaved fashion. Reassembling these received cells into their appropriate PDUs for use by the NIC takes place in two parts. In the first part of the process, the received cells are divided up by virtual circuit, and the cells for one virtual circuit are stored in a linked list of slots, where each slot contains one ATM cell as well as information to link the cells together. These slots are stored in local memory on the NIC. Cells from each virtual circuit are linked together, with a separate linked list of cells for each virtual circuit. Thus, the present invention takes advantage of the asynchronous nature of the ATM network and is capable of building up any number of groups of cells simultaneously, each group corresponding to a particular virtual circuit.

A programmable group size parameter defines how many cells are grouped together in a linked list before the group is dispatched to system memory in the host computer. When the number of cells in a linked list reaches this programmable group size, or when the last cell of a PDU arrives, the linked list of cells for a particular virtual circuit is ready for the second part of the process, direct memory access (DMA) transfer. Thus, a group of cells of any size for a particular virtual circuit may be reassembled from the received interleaved data into part of a PDU before sending to the host computer memory.

The DMA process uses buffers in the host computer's memory to complete the PDU reassembly process. These buffers are originally assigned by the software driver. Groups of cells are transferred from the NIC to the host computer buffers as a single group. If a buffer fills up, or a PDU is complete, a new host computer buffer is used for additional portions of that PDU or for a subsequent PDU. The improved NIC is able to generate an interrupt to signal the host to allocate buffers on an as-needed basis. Thus, buffers need only be allocated just-in-time to conserve memory in the host. Thus, portions of a PDU partially reassembled in the NIC are sent efficiently to the host computer memory.

In one embodiment, the present invention uses a FIFO device to accept groups of cells for DMA transfer, and to transfer a group directly to the host computer memory. Because the FIFO can be filled as it is sending cells, a whole group of cells can be sent at once. This is advantageous because cells may be sent in sizes of a group, instead of one cell at a time or a whole PDU at one time. A prior art NIC that sends one cell at a time is disadvantageous because the PCI bus is not being used efficiently. And those prior art NICs that collect one whole PDU within the NIC before transfer to host memory are not using on-board memory of the NIC efficiently because enough memory must be supplied so that the NIC can wait until a whole PDU has been assembled. This causes a large portion of on-board memory of the NIC (or an internal chip) to be dedicated until the complete PDU arrives.

By contrast, the present invention advantageously allows intermediate size transfers of cells in order to use the bus and on-board memory more efficiently. By allowing cells to be grouped into intermediate sizes, and then sent to the system host memory via a DMA transfer, cells arriving at the NIC are dispatched much more quickly to system memory and less on-board memory of the NIC is needed. In a particular embodiment, this intermediate size is defined by a group size parameter for each virtual circuit and is specified by a software driver. Thus, the present invention addresses the issue of bus utilization by controlling the burst size of the DMA transfer as a result of the grouping of ATM cells, and enables excellent on-board memory usage due to the ability to program the number of slots linked together in a group on the NIC before they are sent via DMA transfer to system memory.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention provides improved methods and apparatus for use in a network interface card (NIC) that effectively reduce the "transferring burden" on the interconnecting devices, buses and the host processor by optimizing the amount (i.e., size) of the block of reassembled data transferred from the NIC to the host memory. In doing so, the present invention also minimizes the amount of on-board memory required by the NIC, or increases the number of virtual circuits that are capable of being supported at the same time for a given amount of memory. Because multiple virtual circuits are often used, cells from various virtual circuits are interleaved during transmission from an originating computer to a destination host. Thus, a destination host receives cells for multiple virtual circuits in an interleaved fashion. The present invention is able to segregate these cells according to the cell's associated virtual circuit and then to combine these cells into groups before transfer to the host memory.

By way of example, in accordance with one embodiment of the present invention, there is provided a network interface circuit for use in a NIC that can be used to connect a computer system to a network, such as an ATM network. The NIC reduces the burden placed on the interconnecting devices, buses and on the host processor by reassembling specially-sized blocks (or groups) of the PDU and transferring these blocks when the bus is free. The reassembly process comes in two parts, firstly, grouping cells in programmable group sizes on the NIC, and secondly, transferring these cells in their groups to the host computer memory.

Thus, in accordance with one embodiment of the present invention, the amount of data reassembled and transferred by the NIC is programmable and is based upon the type of the PDU and the established virtual circuit. For example, the NIC may reassemble and transfer a first PDU associated with one virtual circuit in small sized blocks and a second PDU associated with a different virtual circuit in larger sized blocks. Because the size of the reassembled blocks is programmable and may vary from one PDU to another, and from one virtual circuit to another, the transferring burden can be optimized by software.

NETWORK INTERFACE CARD EMBODIMENT

Figure 1A:
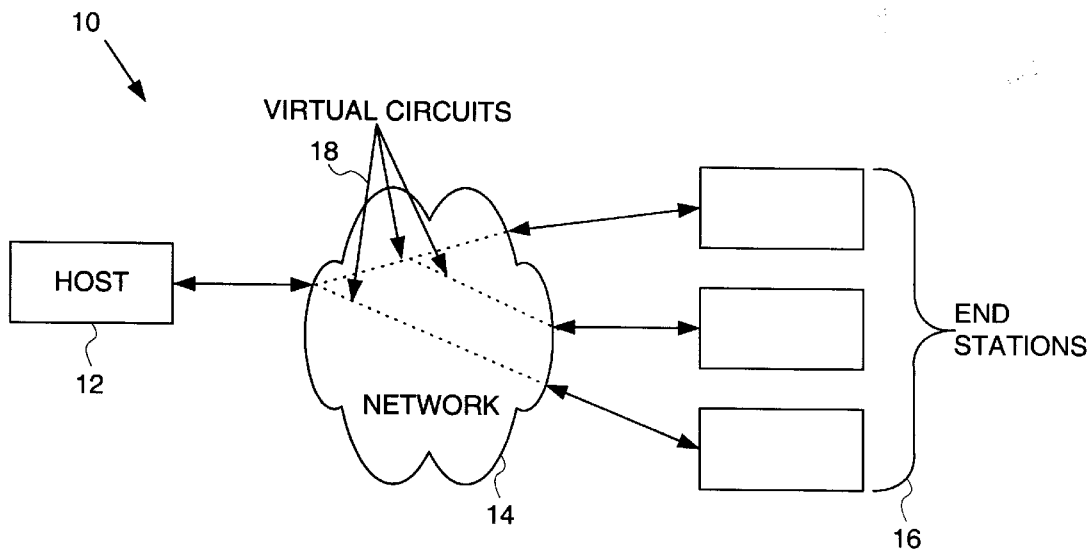
FIG. 1A is a block diagram illustrating a typical ATM network with a first endpoint computer, a network and several additional endpoint computers.
Figure 1B:
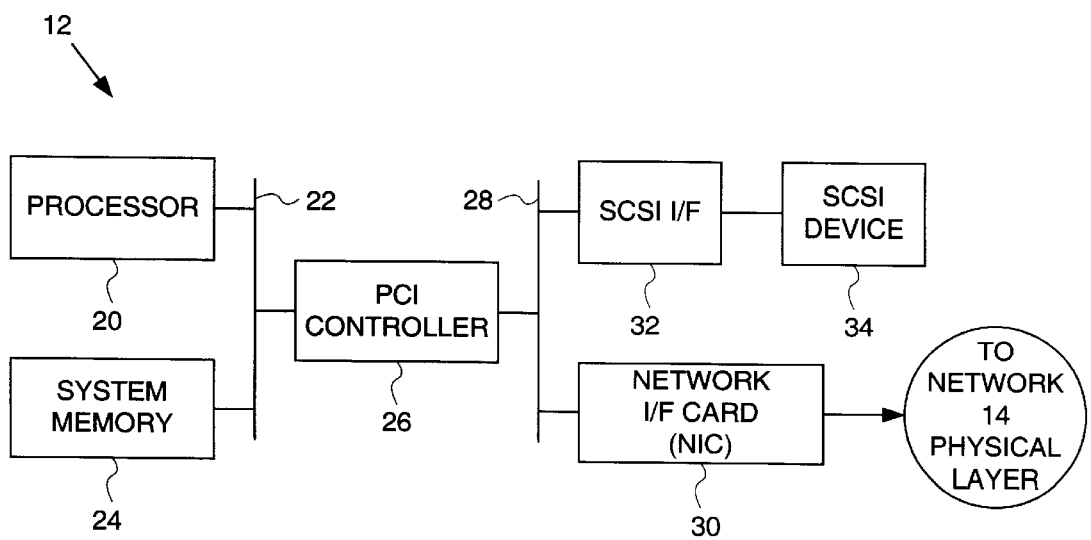
FIG. 1B is a block diagram illustrating a typical endpoint computer of FIG. 1A having a network interface card (NIC)
Figures 2, 3:
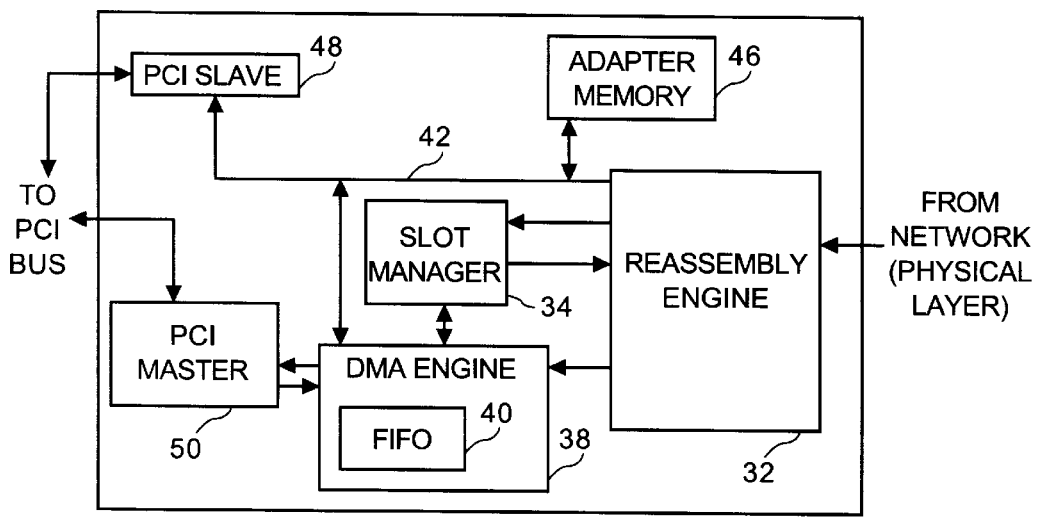
FIG. 2 is a block diagram illustrating an improved network interface card (NIC) in accordance with one embodiment of the present invention.
FIG. 3 is a virtual circuit table useful in the network interface card of FIG. 2, and present in adapter memory 46 in one embodiment of the present invention.

With this in mind, FIG. 2 is a block diagram illustrating an improved network interface card (NIC) 30', in accordance with one embodiment of the present invention. NIC 30' can be used within an endpoint computer to interface with a network, such as an ATM network as illustrated in FIG. 1A, and to receive transmitted cells therefrom.

NIC 30' shows the functional blocks that are used in accordance with one embodiment of the present invention to support receiving data cells. Not shown in FIG. 2 are additional functional blocks that are used in transmitting data cells and in establishing and maintaining the physical layer connectivity with the network itself. Those skilled in the art will recognize that such additional functionality can be embodied in the NIC. For example, a transmitting function is described in detail in U.S. patent application Ser. No. 08/846,355 and a related scheduling function is described in detail in U.S. patent application Ser. No. 08/846,706 both of which are referenced above.

Furthermore, these functional blocks used for receiving cells may be implemented in a wide variety of hardware. By way of example, these blocks may be implemented within a single integrated circuit, or within a NIC present on a circuit board in a variety of integrated circuits. Preferably, the functional blocks of FIG. 2 except for adapter memory 46 are implemented within a single integrated circuit. In this embodiment, adapter memory 46 is implemented as external SRAMs. In another embodiment, all blocks may be implemented on one integrated circuit.

As shown in FIG. 2, NIC 30' includes a reassembly engine 32, a slot manager 34, a DMA engine 38 containing a FIFO structure 40, an adapter memory 46, a PCI slave interface 48 and a PCI master interface 50. A memory bus 42 bidirectionally connects the reassembly engine, slot manager, DMA engine, the adapter memory, and the PCI slave. NIC 30' receives data from the physical layer in network 14 over virtual circuits 18 and passes the data to reassembly engine 32. The general function of each of these functional blocks will now be described, and their particular use is described in greater detail in the below figures.

Reassembly engine 32 receives interleaved cells corresponding to a variety of virtual circuits from the ATM network. Based upon a group size parameter, the reassembly engine takes these cells and assembles them into groups for each virtual circuit, storing the groups as a linked list of slots. A slot is a unit of memory capable of holding a cell; slots are available in adapter memory 46. Adapter memory 46 is coupled to memory bus 42 and is configured to store a plurality of these linked cells in defined slots. Adapter memory 46 also holds a virtual circuit table 100, as well as other status and data. In a preferred embodiment, adapter memory 46 is a static random access memory (SRAM) that is programmable and is 128 Kbytes to 2 Mbytes in size. However, adapter memory 46 can include any type of memory circuit and can be increased or decreased in size as required for a specific application.

Slot manager 34 manages the slots in the adapter memory. The slot manager keeps track of a list of available slots in adapter memory called the free slot list. Upon request from the reassembly engine, the slot manager allocates slots and provides them to the reassembly engine. The slot manager is also able to provide slots to the DMA engine and receives slots from the DMA engine when these slots are reallocated after a DMA transfer.

DMA engine 38 in general manages the DMA process and maintains a DMA service list containing groups of cells ready to be transferred to system memory 24. When a group is available for transfer, the DMA engine reads the data from a group of slots to a FIFO 50 and then the data is sent via DMA transfer to the host memory. The DMA engine also manages the buffer descriptors lists and completion descriptors list of FIG. 5.

PCI slave interface 48 connects to memory bus 42, PCI master interface 50 connects to DMA engine 38 and both interface with PCI bus 28 and are capable of communicating with processor 20 and system memory 24. Additionally, NIC 30' has an interface with, and is controlled by, a software driver. A software driver is known to those of skill in the art as particular software that interfaces between a high level application that wishes to send or to receive information and low level hardware such as a NIC 30' that actually sends or receives the information from the physical layer.

Now that a high level view of an improved network interface card (NIC) has been described, operation of such a card in the context of the present invention will now be described in greater detail. FIG. 3 shows an embodiment of a virtual circuit table 100 used to keep track of information related to virtual circuits that are used in an ATM network. virtual circuit table 100 is used in the reassembly of cells into PDUs. Table 100 has an entry for each virtual circuit in use. For example, shown are rows of entries for a virtual circuit #1 102, virtual circuit #2 104, virtual circuit #3 106, and additional virtual circuits 108. Table 100 is preferably implemented in adapter memory 46 of NIC 30' and may contain from 128 to 16k entries. In one embodiment, each entry is 16 words long (or 64 bytes). The first seven words are used for receiving a PDU, while the last nine words are used to transmit PDUs. In a particular embodiment, table 100 begins at adapter memory address 0.

A wide variety of information related to each virtual circuit may be stored in virtual circuit table 100. By way of example, status field 120 stores information relating to the status of the reassembly process for the PDU that is being received over a particular virtual circuit such as whether a group has been assembled or not, whether there was a CRC error, whether the group assembly process ran out of slots, whether there was congestion upon receiving data, the state of the virtual circuit, the total number of cells so far of a PDU, etc.

CRC field 122 stores the current cyclic redundancy check for the PDU. Control field 124 contains control information for the reassembly process such as a group size parameter, the traffic type of the channel (such as AAL5 or raw cell), which DMA list (queue) to use for a virtual circuit (low priority queue or high priority queue), etc.

The group size parameter is a programmable value that defines the number of cells to accumulate from a given virtual circuit before sending those cells on to the system memory 24 of the host computer. Preferably, the group size parameter is programmable by the software driver, that piece of software that deals directly with the NIC. The flexibility provided by the programmable group size parameter allows reassembly of PDUs to take place fully in the adapter memory 46, to take place fully in system memory 24, or to occur partially in each of those memories. The ability to optimize the number of cells that are grouped before sending them to the system memory provides an advantageous feature of the present invention because intermediate sizes of cells may be grouped and sent rather than simply sending one cell at a time or sending the whole PDU at once.

The software driver may set the group size to be different for each virtual circuit, or it may be the same. The group size may be set based upon a particular type of PDU known to be received over a virtual circuit, may be set based upon the type of virtual circuit used, or may be based upon other information. Also, the group size may also be dynamically changed by the software driver depending upon a variety of inputs such as the type of PDU being sent and the type of virtual circuit being used. Also, the group size may be dynamically changed in response to a lack of slots in adapter memory 46. If slots are running low, the slot manager 36 is able to interrupt the software driver and request that the group size be decreased. This would result in more memory becoming available in adapter memory 46. Although bus utilization might suffer, more on-board memory would become available, resulting in more slots available. Additionally, the system bus could be monitored, and the group size can be increased if bus utilization is becoming less efficient. For example, if latency on the bus is high, then group size could be increased. In one particular embodiment of the invention, the group size parameter is set to four cells for each virtual circuit. For optimization of the group size parameter, it may also be advantageous to increase the group size for systems that allow larger burst sizes for a DMA transfer.

In one embodiment of the present invention, the group size parameter is a 4-bit number from 0 to 15 that defines how many cells are to be grouped before the group is sent as a whole to system memory. By way of example, the parameter may correspond to the following number of cells: 0—a full PDU; 1—one cell; 2—two cells; 3—three cells; 4—four cells; 5—five cells; 6—six cells; 7—seven cells; 8—eight cells; 9—sixteen cells; 10—thirty-two cells; 11—sixty-four cells; 12—one hundred and twenty-eight cells, 13—two hundred and fifty-six cells; 14—five hundred and twelve cells; 15—one thousand and twenty-four cells. Of course, other cell groupings are possible. If a PDU contains a number of cells less than the group size, then that PDU is processed together as one group. Similarly, as a PDU is being processed, if its total number of cells is not a multiple of the group size then the last set of cells will be processed as a group even though this last set is smaller than the group size.

Cell counter 126 is a counter that keeps track of how many cells are currently being assembled into a group before the group is sent to system memory. When the cell counter reaches the number of cells to be grouped as indicated by the group size parameter, the group is readied for dispatching to system memory, the cell counter is decremented to zero, and a new group is begun to be assembled. Buffer status 128 contains information on the buffers in system memory such as the buffer address, buffer length, and the buffer identification (buffer ID). These buffers are used in the DMA process to complete the PDU reassembly process. These buffers are originally assigned by the software driver. Groups of cells are transferred from the NIC adapter memory to the host computer buffers as a single group. If a buffer fills up, or a PDU is complete, a new host computer buffer is used for additional portions of that PDU or for a subsequent PDU. In particular, buffer status 128 contains the buffer address and buffer length of the buffer in system memory 24 to which a group for that particular virtual circuit is currently being sent.

In one embodiment of the invention, as cells of a virtual circuit are being grouped they are stored in a linked list. The linked list is implemented in units of "slots", each slot containing one ATM cell as well as information and pointers to link the slots together. By way of example, a slot includes a header portion and a data portion. The header stores information about the reassembled PDU and linking pointers. The data portion stores the actual ATM cell payload. Slots that are not currently assigned to a cell are called "free slots" and are stored in adapter memory 46. All of these available slots in memory 46 are linked together in a free slot list, where slots can be removed and assigned to a cell that is in a group being assembled as needed. A slot may have a variety of sizes. By way of example, each slot uses 64 bytes in adapter memory 46.

The pointers first slot 130 and last slot 132 of virtual circuit table 100 are used to keep track of the linked list of cells being assembled into a group for a given virtual circuit. First slot 130 indicates the first slot containing the first cell in the group that is currently being assembled for a particular virtual circuit, while last slot 132 points to the last slot of the group that is currently being assembled. Use of these slots is described in greater detail below in FIG. 4.

Reassembly Process

Reassembling received cells into their appropriate PDUs for use by the host takes place in two parts. In the first part of the process, the received cells are divided up by virtual circuit, and the cells for one virtual circuit are stored in a linked list of slots in groups of a programmable size. In the second part of the process, cells are transferred by group using a direct memory access (DMA) procedure. This first part will now be explained in greater detail with reference to FIG. 4.

Figure 4A:
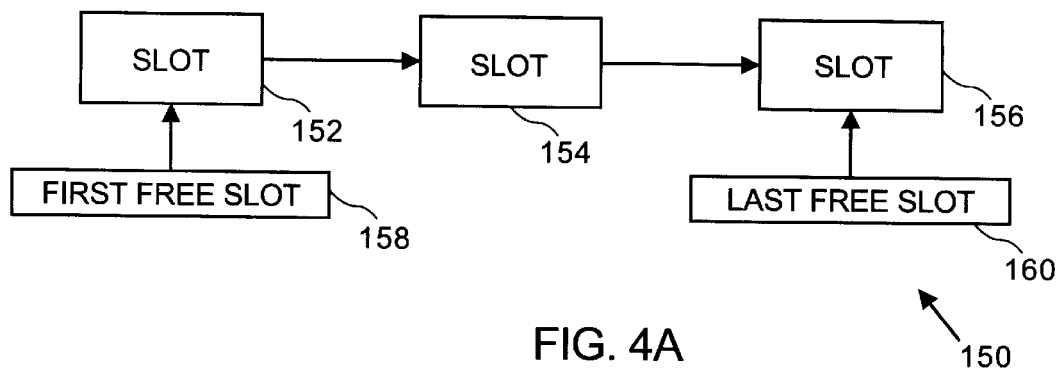
FIG. 4A is a free slot list present in adapter memory 46 in one embodiment of the present invention.

FIG. 4A is a symbolic view of a linked list 150 of free slots in adapter memory 46. This list of free slots includes the slots currently unassigned to a particular cell and available for use. These slots are removed from list 150 when assigned to incoming cells. Free slot list 150 includes a first slot 152, a second slot 154, a third slot 156, as well as linking pointers. Of course, any number of slots may be present in the list. A first free slot pointer 158 points to the first slot in the list, and a last free slot pointer 160 points to the last slot. In addition, various bits within a slot indicate whether the slot is the last slot in a group or PDU, whether there is an error condition, etc.

Figure 4B:
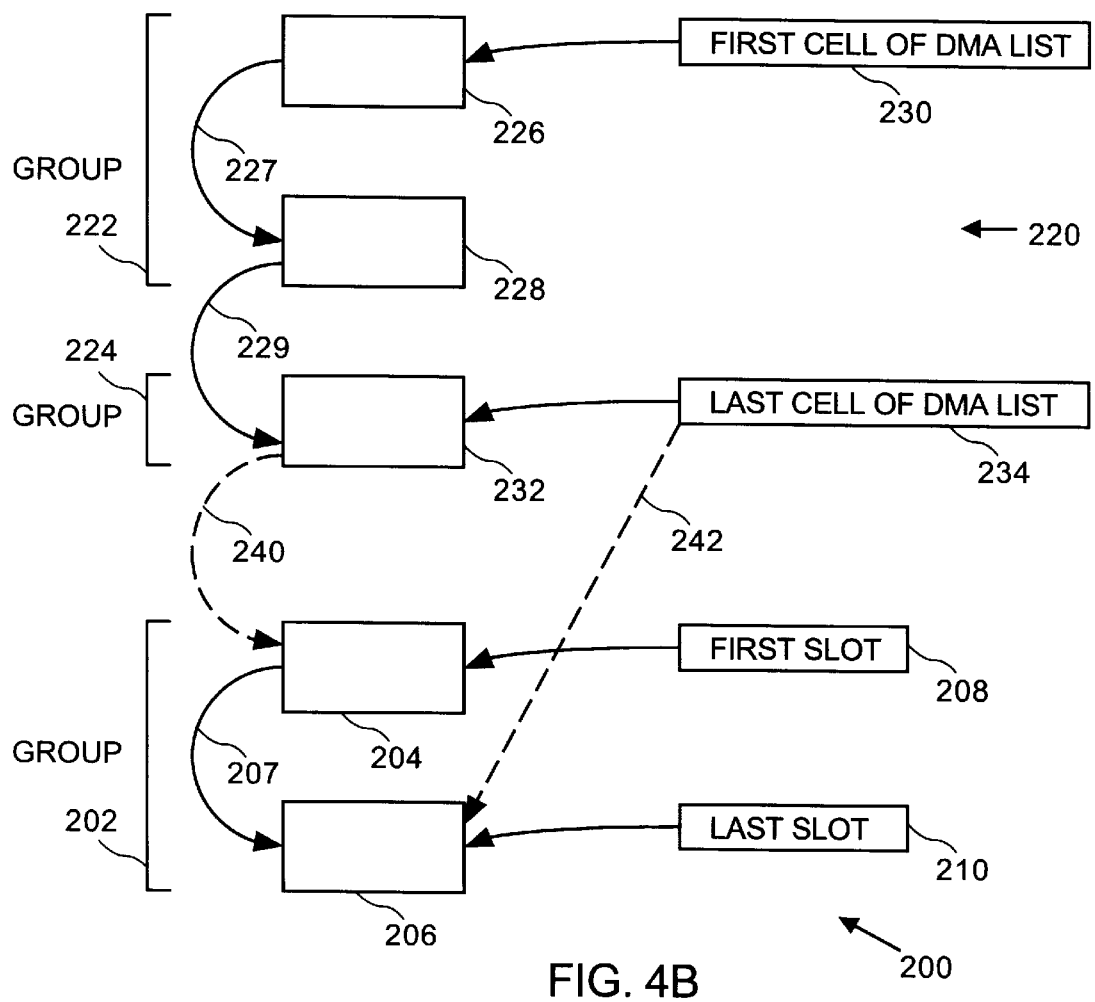
FIG. 4B illustrates graphically incoming cells being grouped together and being placed on a DMA list in accordance with an embodiment of the present.

FIG. 4B is a symbolic view of a process 200 by which incoming cells corresponding to a particular virtual circuit are grouped and assigned to a DMA list 220. FIG. 4B shows a number of cells that are currently being assembled into a group 202. Included in group 202 are cells 204 and 206 linked by a pointer 207. A pointer first slot 208 indicates the first slot 204 for this particular virtual circuit. As shown in FIG. 3, first slot 208 is present in virtual circuit table 100 for one of any of the virtual circuit entries. Likewise, last slot 210 is found in virtual circuit table 100 for the same particular virtual circuit and indicates last slot 206. As will be appreciated by those of skill in the art, these pointers may be updated as group 202 changes in size.

Also shown in FIG. 4B is a DMA list 220 indicating groups of cells of particular virtual circuits ready for a DMA transfer. In a preferred embodiment, there are two DMA lists, for two different priorities. Of course, any number of different DMA lists may be used to represent various priorities. Group 222 and group 224 are currently part of this DMA list 220. Group 222 includes slot 226 connected by a pointer 227 to slot 228. Group 224 has only one slot 232, connected to slot 228 by pointer 229. First cell of DMA list pointer 230 indicates the first cell of this DMA list, namely the cell of slot 226. Last cell of DMA list pointer 234 indicates the last cell of this DMA list, namely the cell of slot 232. It should be appreciated that any number of groups of different sizes may be present in this DMA list. And although different groups corresponding to different virtual circuits may be present in this DMA list, the DMA list encompasses all of the cells from these groups. A technique for utilizing these lists in the context of the present invention will now be described.

As described above, the reassembly process includes a first part which involves grouping incoming cells. Initially, a cell is received over an ATM network on a particular virtual circuit. When the cell is received, its header is examined to determine to which virtual circuit it corresponds, and therefore in which group the cell will be placed. Cells corresponding to a particular virtual circuit are grouped together until the number of cells reaches the group size parameter, at which point a new group for that virtual circuit is started. Once the virtual circuit for the received cell is determined, then a slot from the free slot list 150 is allocated, the cell data is copied to that allocated slot, and the slot is added to the linked list for the group that is currently being assembled for that virtual circuit. For example, group 202 for a particular virtual circuit shows a newly added slot 206 containing the most recently arrived cell for that group.

Next, the cell counter field of the virtual circuit table 100 corresponding to the appropriate virtual circuit is incremented by one to indicate that a new cell has been added to the group. Also, the last slot pointer of virtual circuit table 100 for the same virtual circuit is updated to point to the newly added slot containing the new cell. As new cells are received that belong to this particular virtual circuit, these cells are added to the group being assembled. Furthermore, as cells arrive corresponding to different virtual circuits, they are assembled into groups for each virtual circuit in a similar fashion. Thus, each virtual circuit has a corresponding group of cells being assembled at any given time, and in this fashion cells arriving sequentially corresponding to different virtual circuits can be routed to the correct group for assembling.

Considering one group in particular for a given virtual circuit for the moment, when a specified number of cells arrive (corresponding to the group size parameter for that virtual circuit) the group is scheduled for DMA transfer. The group is also scheduled for DMA transfer if the last cell received is the last cell for that PDU. If this is the case, then the group being assembled is added to the DMA list. Also, OAM F5 cells are added to the DMA list independently of PDUs being reassembled.

Referring back to FIG. 4B, consider the situation where DMA list 220 exists with groups 222 and 224, and group 202 is being scheduled for DMA transfer. In order to add group 202 to DMA list 220, a pointer 240 from slot 232 is assigned to indicate slot 204; in this fashion, group 202 is added to DMA list 220. In addition, last cell of DMA list pointer 234 is updated to point to slot 206 instead of to slot 232, as indicated by dashed arrow 242. Finally, the cell counter for that particular virtual circuit in the virtual circuit table 100 is set equal to zero to indicate that the first slot and last slot pointer of the virtual circuit table are meaningless. Thus, in the first part of the reassembly process, incoming cells are grouped by virtual circuit into groups of programmable sizes and prepared for DMA transfer by placement into a DMA list.

If, by chance, adapter memory 46 runs out of memory, then the cells in the current group being assembled are freed so that the slots to which the cells correspond may be returned to the free slot list. The virtual circuit is then put into a "discard" state and will discard all incoming cells until the last cell of that particular PDU arrives. When the last cell of that PDU does arrive, it is scheduled for DMA transfer. This results in an "error" end of PDU cell being generated, which eventually results in an error being returned to the software driver indicating that the PDU received an error.

The reassembly process includes a second part which involves DMA transfer of the grouped cells to the host computer. This second part takes groups of cells from the DMA list 220 and transfers them directly to system memory 24 of the host computer 12. This part will now be explained first by reference to FIG. 5 and then by a description of a procedure that may be used for the transfer.

Figure 5:
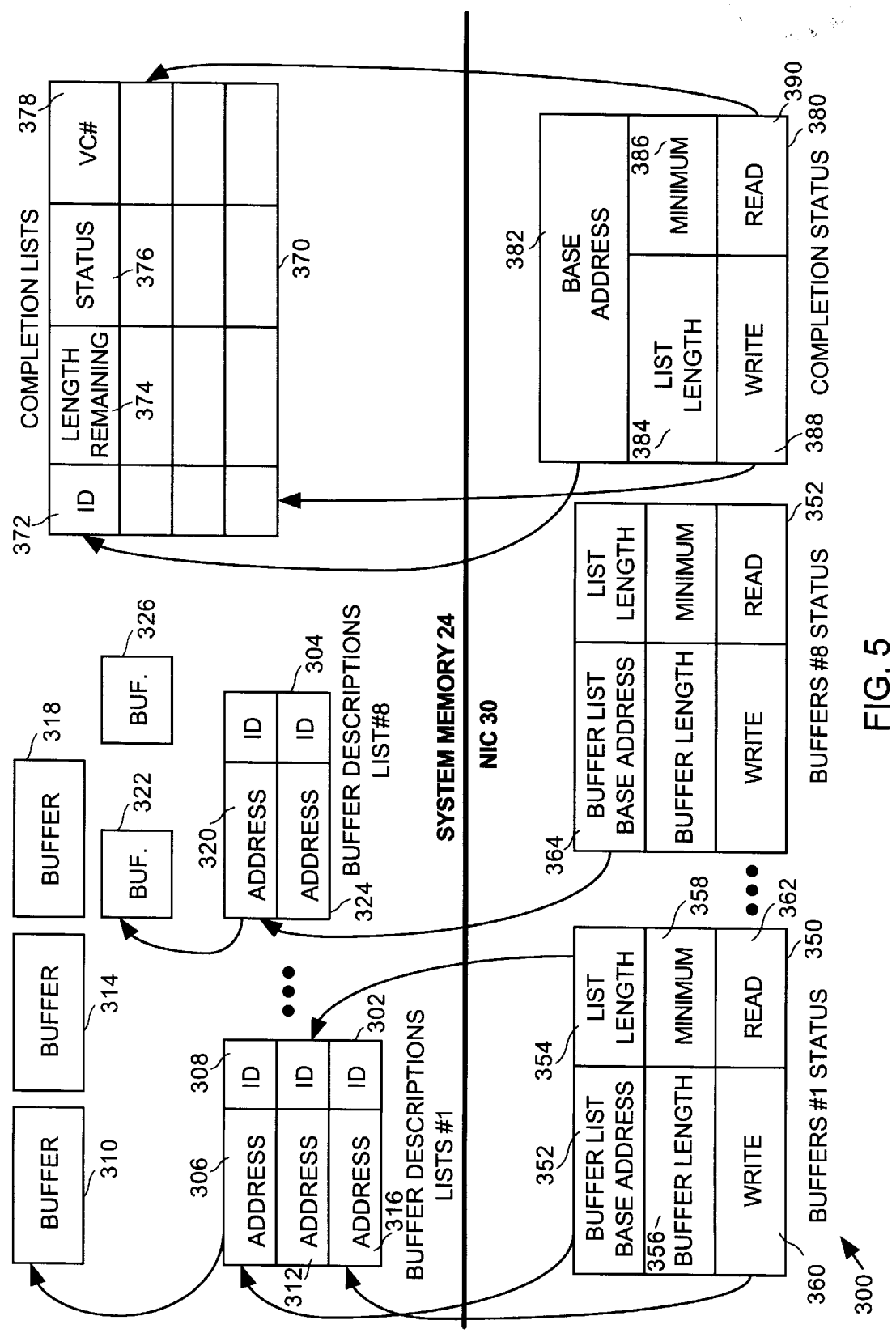
FIG. 5 illustrates the interaction of various data structures present in the network interface card of FIG. 3 and the system memory of the host computer of FIG. 1B.

FIG. 5 shows data structures 300 useful for a DMA transfer of groups of cells from a NIC 30' (lower half) to system memory 24 (upper half). The data structures present on NIC 30' may be in adapter memory 46, or may be present elsewhere on NIC 30'. System memory 24 uses any number of lists of buffers to hold the transferred groups of cells. Each list of buffers may have buffers of a different size from another list of buffers in order to accommodate PDUs of different sizes. For example, one list of buffers may have buffers of 16 k bytes, while another list of buffers may contain buffers all of 1.5 k bytes. In one particular embodiment, there are eight circular lists of buffers. These circular lists may be implemented using IEEE standard 1212.1-1993. In one embodiment, each virtual circuit is assigned to a particular list of buffers in order to take advantage of PDUs of a particular size received on that virtual circuit if the PDU size on the virtual circuit is known in advance. By using buffers the same size as a PDU, the memory transfer process and usage of memory is more efficient.

A buffer descriptors list 302 is used to keep track of the buffers in one of the lists. A total of eight buffer descriptors lists from list 302 up to buffer descriptors list 304 are used to manage eight different lists of buffers. With reference to list 302, each buffer descriptors list has a list of entries 312, each entry corresponding to and referencing one of the buffers in that list. For example, address 306 of the first entry points to buffer 310 of that list, and has an associated ID 308 which is extra data that may be inserted by the software driver for later identification of a buffer. Similarly (although not shown), address 312 points to buffer 314 and address 316 points to buffer 318. If there were more buffers in the list 302, more entries would be added. In a similar fashion, list 304 references another list of buffers that are smaller in size. Address 320 points to buffer 322 and address 324 points to buffer 326.

Within NIC 30', any number of buffer status blocks 350 keep track of the buffer lists of system memory 24. In one particular embodiment, there are eight buffer status blocks, ranging from status block 350 to status block 352, each status block corresponding to and referencing one of the buffer descriptors list 302 through 304. With reference to status block 350 as an example, each status block includes a buffer list base address 352 giving the base address of list 302 in system memory. List length 354 indicates the length of list 302, buffer length 356 gives the length of the buffers referenced by list 302, and minimum 358 indicates the minimum number of remaining buffers before generating an interrupt.

Write pointer 360 indicates the index following the index of the last buffer descriptor made available in list 302 by the host. Read pointer 362 indicates the index following the index of the latest buffer made use of by DMA engine 38 for transferring a group of cells. Thus, there should always be enough buffer descriptors available for transfer by DMA engine 38. A wide variety of techniques may be used to allocate new buffers. By way of example, in one embodiment of the invention, if the read pointer 362 comes within a pre-programmed value (minimum 358) of the write pointer 360, then an interrupt is generated and more buffers are requested from the host. In another embodiment, there may exist a cache on NIC 30' of four buffer descriptor entries for DMA list 322. The cache permits multiple descriptors to be loaded with a single burst. Buffer status block 352 is implemented in a similar manner as status block 350. Thus, in a similar fashion, buffer list base address 364 points to the base address of buffer descriptors list 304. The other fields and pointers of status block 352 may be implemented in a manner similar to status block 350, as would other status blocks.

Returning now to a discussion of system memory 24, when a buffer is filled or a PDU is finished, information for that buffer or PDU is saved in a completion descriptors list 370. List 370 includes a variety of information for each completion entry, corresponding to a row of the table shown. A completion entry is entered for each buffer when a buffer is filled or when a PDU is finished being transferred. The completion ID 372 is the same as the buffer descriptor ID found in a buffer descriptors list. For example, when buffer 310 is filled, its ID 308 would be entered as ID 372. Length remaining 374 indicates the length remaining in the buffer that was not completely filled with data. When an entry is made because a buffer has been filled, length remaining becomes zero, although if a PDU is finished part way through a buffer the length remaining would have a non-zero value. Status 376 indicates whether the end of a PDU has been reached for that buffer, among other values. This status value is useful for a software driver in determining whether a PDU resides in more than one buffer. Field VC# 378 indicates the number of the virtual circuit associated with the buffer that has been entered as a completion entry. Other information relating to a buffer or PDU may also be stored in this list.

Within NIC 30', a completion status block 380 keeps track of completion descriptors list 370 in system memory. Base address 382 indicates the base address of list 370 in system memory, list length 384 indicates the number of entries in the completion list and minimum 386 indicates the minimum number of free entries in the completion list allowed before an interrupt is generated.

Similar to the write and read pointers of the buffer status block 350 through 352, completion status block has a write pointer 388 and a read pointer 390. Write pointer 388 indicates the index after the index of the latest completion descriptor made available by the host, and read pointer indicates the index after the index of the latest completion entry made by DMA engine 38 when a buffer is filled or a PDU finished. New completion descriptors may be added to completion descriptors list 370 using any suitable technique. Now that various of the data structures 300 have been described, one embodiment of a technique by which groups of cells may be transferred to the host will be described.

The second part of the reassembly process, the DMA transfer, begins when a group of cells has been placed on DMA list 322. The DMA transfer process will move a group of cells from NIC 30' to system memory 24. Initially, even before transfer is to begin, the host computer pre-allocates lists of buffers and determines appropriate sizes of buffers for a particular list. This step results in any number of buffers being allocated and any number of buffer descriptors lists 302 through 304 being formed.

Next, once a group of cells is placed on DMA list 322, these cells are transferred to a FIFO queue 40 that is capable of transferring cells as these cells are being placed in the queue. FIFO 40 may be any suitable size, although a size of 256 bytes works well. In a preferred embodiment, FIFO 40 is allowed to be filled at the same time as it is being emptied. To determine to which buffer list to transfer the next group, the virtual circuit number is obtained from the header of the cell in the first slot of the group. Because each virtual circuit is assigned to a particular list of buffers (obtained from the buffer status field of virtual circuit table 100), it can be determined to which buffer list to send the group of cells from FIFO 40.

The group of cells is transferred to a first buffer in the appropriate buffer list. If the group is larger than one buffer, then the next buffers in the list are used. If needed, more buffers may be allocated by the host as described above, and once a buffer is full, or the PDU finished, then an entry is made in completion descriptors list 370. If a group of cells does not completely fill a buffer, and the PDU is not yet finished, then other groups of cells corresponding to other virtual circuits are directed towards other buffers, even if other groups are using the same buffer list (same size buffers). Once a next group is received from the original virtual circuit that did not quite fill a buffer, this next group is placed in this partially filled buffer, concatenated with the first group that had been placed earlier. This technique is useful because groups of cells corresponding to different virtual circuits and PDUs are interleaved when sent from NIC 30'. This interleaving occurs because, originally, groups of cells belonging to different PDUs are received in an interleaved fashion over the ATM network. Thus, groups of cells are transferred via DMA to system memory 24 for future use by a software driver.

Although the foregoing invention has been described in some detail for purposes of clarity of understanding, it will be apparent that certain changes and modifications may be practiced within the scope of the appended claims. For instance, the apparatus and method of the present invention may be applied to other non-ATM configured networks and/or data transferring systems. In addition, the invention is applicable to any units of data received, and not necessarily units of cells. That is, the advantageous features of the present invention may be used to receive data units of any size or type, to partially assemble them using a programmable group size, and then to transfer these groups efficiently using a DMA transfer to host memory. Furthermore, the circuits disclosed above may be implemented in a variety of hardware and/or software, and may be implemented using analog or digital devices, and be present upon a single integrated circuit or any number of electronic devices. And although the present invention has been described in the context of a network interface card, the invention may be practiced using any suitable hardware arranged to receive units of data for reassembly. Also, the data structures as shown above including the virtual circuit table, buffer lists, status blocks, linked lists, etc., may be implemented using a wide variety of techniques as will be appreciated by those of skill in the art. Therefore, the described embodiments should be taken as illustrative and not restrictive, and the invention should not be limited to the details given herein but should be defined by the following claims and their full scope of equivalents.

We claim:

1. A receiving apparatus for partially reassembling cells of data of a protocol data unit received over an asynchronous transfer mode (ATM) network by a host computer system, the receiving apparatus comprising:

an adapter memory including memory slots arranged for the storage of data;

a memory location in the adapter memory holding a value for a group size parameter wherein the group size parameter is less than the number of cells in the protocol data unit;

a reassembly engine circuit arranged to receive the cells of data and to allocate one of the memory slots for each received cell, each of the cells of data indicating one of a plurality of virtual circuits to which each of the cells of data corresponds, the reassembly engine circuit being further arranged to form groups of the cells of data based upon one of the virtual circuits to which the groups of the cells of data belong, each group of the cells of data having a size defined by the group size parameter; and a direct memory access (DMA) engine circuit arranged to receive the groups of the cells of data and to transfer the groups of the cells of data via a DMA transfer to a system memory of the host computer system, whereby the protocol data unit is reassembled in the system memory;

wherein the memory location holding the value for the group size parameter is arranged to hold a changing value for the group size parameter such that the group size parameter is programmed in order to optimize the reassembly of the protocol data unit.

2. A receiving apparatus as recited in claim 1 further comprising:

a virtual circuit table to manage the groups of the cells of data, the virtual circuit table including a plurality of virtual circuit entries, each virtual circuit entry having a virtual circuit identifier and a pointer indicating one of the groups of the cells of data corresponding to the virtual circuit entry.

3. A receiving apparatus as recited in claim 1, embodied in a single integrated circuit of a network interface card.

4. A receiving apparatus as recited in claim 1 wherein the received cells of data are interleaved and correspond to a plurality of protocol data units and wherein the reassembly engine circuit is further arranged to group the received cells of data by one of the protocol data units to which the group of the cells of data belongs.

* * * * *